United States Patent
Mashkin et al.

(10) Patent No.: US 11,010,918 B2
(45) Date of Patent: May 18, 2021

(54) APPARATUS AND METHOD FOR ANGLE-BASED LOCALIZATION OF A POSITION ON A SURFACE OF AN OBJECT

(71) Applicant: Siemens Aktiengesellschaft, Munich (DE)

(72) Inventors: Andrey Mashkin, Cologne (DE); Florian Röhr, Mülheim a.d. Ruhr (DE); Guido Schmidt, Leichlingen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/634,200

(22) PCT Filed: Aug. 3, 2018

(86) PCT No.: PCT/EP2018/071188
§ 371 (c)(1),
(2) Date: Jan. 27, 2020

(87) PCT Pub. No.: WO2019/025614
PCT Pub. Date: Feb. 7, 2019

(65) Prior Publication Data
US 2020/0184670 A1    Jun. 11, 2020

(30) Foreign Application Priority Data

Aug. 4, 2017    (DE) ................. 10 2017 213 555.7

(51) Int. Cl.
*G01B 5/24*        (2006.01)
*G06T 17/00*    (2006.01)
(Continued)

(52) U.S. Cl.
CPC .................. *G06T 7/70* (2017.01); *G01B 5/24* (2013.01); *G01B 11/002* (2013.01); *G06T 17/00* (2013.01); *H04N 5/2253* (2013.01); *H04N 7/18* (2013.01)

(58) Field of Classification Search
USPC .......................... 348/61, 42, 47, 48, 51, 135
See application file for complete search history.

(56) References Cited

U.S. PATENT DOCUMENTS

| | | |
|---|---|---|
| 2008/0211808 A1 | 9/2008 | David et al. |
| 2010/0102980 A1 | 4/2010 | Troy et al. |

(Continued)

FOREIGN PATENT DOCUMENTS

| | | |
|---|---|---|
| CN | 103424096 A | 12/2013 |
| DE | 102009019920 A1 | 11/2010 |

(Continued)

OTHER PUBLICATIONS

Grimson W Eric L et al: "Model-based Recognition and Localization from Sparse Range or Tactile Data"; The International Journal of Robotics Research; vol. 3, No. 3, pp. 3-35; 1984.

(Continued)

*Primary Examiner* — Daquan Zhao

(57) ABSTRACT

An apparatus for angle-based localization of a position on a surface of an object includes an orientation sensor configured to be arranged in a known relationship relative to a position, to be identified, on a surface of an object at at least one measurement time and to capture angle information items in respect of the current orientation thereof at the measurement time, and a programmable device, with a processor and a memory, wherein the memory contains instructions and at least one assignment prescription for the object with the surface, where angle information items are assigned associated positions on the surface of the object, and wherein the instructions cause the programmable device (Continued)

to receive the angle information items captured at the measurement time by the orientation sensor and to establish the position to be identified by an assignment to the captured angle information items on the basis of the assignment prescription.

19 Claims, 5 Drawing Sheets

(51) Int. Cl.
*G06T 17/05* (2011.01)
*G06T 19/00* (2011.01)
*H04N 7/18* (2006.01)
*G06T 7/70* (2017.01)
*G01B 11/00* (2006.01)
*H04N 5/225* (2006.01)

(56) References Cited

U.S. PATENT DOCUMENTS

| | | |
|---|---|---|
| 2014/0215841 A1 | 8/2014 | Danbury et al. |
| 2015/0016666 A1* | 1/2015 | Payne, Jr. ................. G06T 7/73 |
| | | 382/103 |
| 2015/0023602 A1 | 1/2015 | Wnuk et al. |
| 2017/0016862 A1* | 1/2017 | Holmes .............. G01N 29/4427 |

FOREIGN PATENT DOCUMENTS

| | | |
|---|---|---|
| DE | 102010017304 A1 | 12/2011 |
| WO | 2004046651 A1 | 6/2004 |
| WO | 2014027002 A1 | 2/2014 |
| WO | 2015114309 A1 | 8/2015 |
| WO | 2015181827 A1 | 12/2015 |

OTHER PUBLICATIONS

PCT International Search Report and Written Opinion of International Searching Authority dated Nov. 12, 2018 corresponding to PCT International Application No. PCT/EP2018/071188 filed Aug. 3, 2018.

* cited by examiner

APPARATUS AND METHOD FOR ANGLE-BASED LOCALIZATION OF A POSITION ON A SURFACE OF AN OBJECT

CROSS REFERENCE TO RELATED APPLICATIONS

This application is the US National Stage of International Application No. PCT/EP2018/071188 filed 3 Aug. 2018, and claims the benefit thereof. The International Application claims the benefit of German Application No. DE 10 2017 213 555.7 filed 4 Aug. 2017. All of the applications are incorporated by reference herein in their entirety.

FIELD OF INVENTION

The present invention relates to an apparatus for the angle-based localization of a position on a surface of an object, in particular on components of turbines or generators. The invention also relates to a method for the angle-based localization of a position on a surface of an object, which method is suitable for the apparatus.

BACKGROUND OF INVENTION

In the field of mechanical engineering and power plant engineering, many large installations and machines have a complex geometry, for example gas or steam turbines or generators. Inspections, during which faults or damage or sources of anomalies to be monitored, for example, are intended to be localized or are intended to be assigned to a specific component of the installation, are a problem for the inspector if only individual sections of the surface of a component of the installation are accessible to the inspector or, although conspicuous locations are discernible, it is not visually clear, on account of the complex form of the components possibly arranged close to one another, which component of the installation the source belongs to.

In a stator of a turbo generator for example, the individual conductors of the stator winding are arranged around the rotor in the grooves of a magnetic core. These conductors are indeed possibly visible when they emerge from the magnetic core if the rotor is not installed. However, on account of the number of conductors, counting, for example from the uppermost or lowermost point of the stator, in order to determine the correct number of the conductor, is potentially erroneous. In addition, they generally have a bent shape at least in the end region, so-called involute, with the result that it is difficult to assign a source remote from the starting region of the involute and the magnetic core to the correct starting region by tracking the course of the involute. If the rotor is installed, only an inspection from the outside is possible, in which case the view of many regions is possible only to a very restricted extent on account of covers, fastening elements etc.

In turbines as well, for example gas turbines or steam turbines, their complex geometry constitutes a difficulty when localizing sources or when exactly assigning them to components of the turbines. For example, the cross section of a turbine blade is convex, concave or else round, depending on the section considered. In order to exactly identify the affected blade in the multiplicity of turbine blades, the component number must therefore be determined if it is accessible. Alternatively, an attempt can be made to exactly localize the component with the source by measuring distances to known points.

Complicated methods for special applications determine components during operation. DE 10 2009 019 920 A1 thus provides for the axial position of a blade of a rotor to be determined on the basis of its current vibration characteristic in comparison with recorded vibrational deflections. However, blades detected during a visual inspection cannot be assigned in such a way without potentially damaging reactivation of the rotor of the turbine.

In contrast, the localization of a source by measuring distances may be part of a visual inspection, but presupposes very accurate working and can easily lead to incorrect localization or incorrect assignments, as a result of which incorrect components are possibly replaced, which can result in high costs, on the one hand, and in a threat to operational safety, on the other hand, if a faulty component remains in the installation.

In addition, inspectors often document conspicuous locations which have been found with photos, for example in order to use them later in a report. On account of the possibility of incorrectly assigning the source to the affected component, the images are therefore possibly also incorrectly assigned and are compared with other images, which were recorded earlier for example or are intended to show the source from another perspective, but now do not show the same affected component, which can likewise result in errors and inefficient work or inadequate inspection results.

SUMMARY OF INVENTION

An object of the present invention is to provide an improved possible way of reliably localizing a position of a source on the surface of a machine, an installation or another object with a complex geometry and assigning it to the associated component.

This object is achieved, according to the invention, with an apparatus for the angle-based localization of a position on a surface of an object and a method for the angle-based localization of a position on a surface of an object and a computer program product. Advantageous developments of the invention are stated in the subclaims.

According to a first aspect of the invention, an apparatus for the angle-based localization of a position on a surface of an object comprises an orientation sensor which is configured to be arranged in a known relationship relative to a position to be identified on a surface of an object at least at a measurement time and to capture angle information relating to its current orientation at least at the measurement time, and a programmable device at least with a processor and a memory, wherein the memory has instructions and at least one assignment rule for the object with the surface, which rule is used to assign associated positions on the surface of the object to angle information, and wherein the instructions, when executed by the processor, cause the programmable device to receive the angle information captured by the orientation sensor at the measurement time and to determine the position to be identified by means of assignment to the captured angle information on the basis of the assignment rule.

An object with a surface may be, for example, a generator, a gas turbine, a steam turbine or another object with a complex surface and may be composed of a plurality of components or parts. The position to be identified on the surface may denote, for example, a source of a fault identified during an inspection or a location to be monitored, but may also denote another position on the object which is related, for example, to such a source, for example a position which is accessible to the orientation sensor on the surface, which (possibly) belongs to the same component of the object as the actual source.

An orientation sensor determines the orientation or alignment of the sensor in space, which orientation or alignment can be represented as angle information, wherein the angle information indicates the magnitude of the deflection angle of the sensor in the three-dimensional space from a position of rest. A representation in Cartesian coordinates is likewise possible. An orientation sensor or position sensor may be, for example, a gyro sensor, as is often used, inter alia, in mobile telephones and smartphones.

The orientation sensor is configured to be arranged in a known relationship relative to the position to be identified on the surface of the object at least at the measurement time, that is to say at the time at which the angle information is intended to be captured by the sensor. This ensures that the assignment rule used to assign the angle information to the positions on the surface can be applied to the angle information to be currently captured. In order to configure the orientation sensor for this, provision may be made for this sensor to be in the form of a mobile unit or part of a mobile unit in order to be able to examine different positions on the surface of the object and also on other objects using the sensor. Provision may also be made for the shape of the sensor or its housing to be such that it can be fitted in a defined relative position with respect to the surface, for example can be placed onto the surface of the object at the position to be identified. For example, the orientation sensor may be accommodated for this purpose in a housing which has a flat surface on the side to be placed onto the object. In one embodiment, provision may be made for the known relationship with respect to the surface to be established using an aid which enables the defined rigid position of the sensor. In this case, provision may be made for the aid to be selected in a manner specifically optimized for the object to be examined, while the orientation sensor itself remains usable with a plurality of aids for different, possibly any desired objects. Provision may also be made for the orientation sensor to be configured, for example by using additional distance sensors, such that it can be contactlessly arranged parallel to the surface.

The assignment rule for the object with the surface depends on the geometrical complexity of the object and can be provided, in particular, in the form of a three-dimensional model of the object, but also, for example, in the form of a formula or a lookup table which is based on the knowledge of the shape of the object and assigns positions on the surface of the object to the angle information or angle coordinates. Since no absolute coordinates in space, but rather angle coordinates or angle information characterizing the respective inclination of the surface, are used to identify the position, the position assignment can be unambiguous or possibly ambiguous, for example when assigning a position on a flat surface, depending on the geometrical shape of the surface of the object. In that case, the entire surface could be assigned using only one measurement. In one embodiment, provision is therefore made for a plurality of measurements to be carried out using the orientation sensor, at least one of which measurements corresponds to a different orientation. For example, complex objects which are arranged substantially concentrically around an axis and consist of a multiplicity of individual components, such as turbines or generators, are particularly suitable for the use of the described position determination apparatus.

In order to be able to use the assignment rule, the programmable device communicates with the orientation sensor and receives the captured angle information, for example via a direct wired or wireless connection, simultaneously or with a time delay, for example after buffering in a memory connected to the orientation sensor or, if the orientation sensor and the programmable device are implemented in the same unit, via write or read access to a common memory. The instructions to be executed by the processor can be present in the form of program code. For example, the orientation sensor may be that of a mobile telephone or smartphone with a processor and a memory, and the instructions may be provided in the form of a smartphone app.

The apparatus for the angle-based localization of a position on a surface of an object makes it possible to determine the position and to assign the position to a particular component of the object on the basis of the knowledge of a model of the object and to determine the orientation or alignment of the surface of the object at the position to be identified. Knowledge of the absolute position can thus be determined, for example, by means of the global positioning system GPS if the object is outdoors. The position can be determined directly without the risk of an incorrect assignment and possibly associated subsequent costs. The inspector must only correctly place the apparatus or the measuring device with the orientation determination sensor for measuring the orientation. There is therefore less need for a special qualification, for example in order to carry out reliable distance measurements in order to determine therefrom which component is at the position to be identified. It is likewise possible to avoid delays which are produced when checking potentially uncertain measurement results. For example, a check with another measuring method then requires, for example, at least one part of the object to be dismantled (in the case of a generator for example, the removal of the rotor in order to be able to better examine the stator).

In one embodiment, the orientation sensor is configured to be at least indirectly brought into physical contact with the surface of the object at least at the measurement time. The orientation sensor can therefore be arranged in a known relationship relative to the position to be identified on the surface of the object in an easily manageable manner and the angle information relating to its current orientation can be captured. The defined position with respect to the surface of the object can therefore be easily established directly by means of a suitable shape of the surface of the orientation sensor or of the unit or housing which contains the sensor or indirectly by means of an aid or holding means which is suitably shaped in a manner adapted to the surface of the object.

In another embodiment, the orientation sensor is configured to distantially or contactlessly assume, possibly supported by further aids, a predefined local relationship, for example parallelism, with respect to the surface of the object in order to thus be arranged in a known relationship relative to the position to be identified on the surface of the object. This is particularly advantageous if, for example, direct placement is not possible as a result of obstacles, a protective cover or the surface temperature. For this purpose, the orientation sensor can be accommodated, for example together with distance sensors, in a housing, the distance signals from which sensors contactlessly make it possible to correctly arrange the orientation sensor in relation to the surface.

In one exemplary embodiment, the apparatus for the angle-based localization of a position on a surface of an object comprises a holding device which makes it possible to at least arrange the orientation sensor in the known relationship relative to the position to be identified on the surface of the object. The holding device is used to hold the orientation sensor in the required known position during the measurement. This may be a holder which holds the sensor or a spacer which makes it possible to place the sensor in such a manner that it rests with the known orientation relative to the surface, that is to say such that the orientation sensor used for inspection has a known angle with respect to the surface as a result.

In one embodiment of the apparatus, the orientation sensor and the programmable device are accommodated in a common housing. The apparatus for the angle-based localization of a position on a surface of an object can therefore be implemented in a single unit.

In one embodiment, the orientation sensor and the programmable device are components of a mobile electronic unit, such as a mobile telephone. A modern mobile telephone, that is to say a smartphone in particular, usually already has as standard an orientation sensor and a processor and a memory, with the result that it can be suitable for easily implementing an apparatus for the angle-based localization of a position on a surface of an object if the assignment rule, for example in the form of a 3-D model of the object, is loaded into the memory and the processor also executes a program or an app which executes the described instructions for determining the position to be identified. In addition, it usually contains a camera, with the result that it is also possible to take photographs of the object. Since the telephone function is not required for the described apparatus, the latter can also be implemented, in principle, as another electronic unit which contains the components required for the described apparatus.

In another embodiment, the holding device comprises the orientation sensor. By virtue of the orientation sensor being accommodated in the holding device in this embodiment, it is not limited to the structural limits of a smartphone housing, for example, but rather can be larger, more voluminous and have more accurate hardware components and/or can have better shielding with more effective compensation for influences of external magnetic fields which could influence the orientation sensor. In this embodiment too, a smartphone with an app can nevertheless be used to implement the apparatus, but the function of the orientation sensor integrated therein is not used in favor of the sensor in the holding device. In one embodiment, the angle information from both sensors is also captured, for example in order to use the redundancy for monitoring or calibration purposes.

In one embodiment, the holding device has a communication interface which can be used to transmit the captured angle information to the programmable device. This provides the advantage that the programmable apparatus can determine the position to be identified even if the apparatus is distributed among at least two separate components.

In one exemplary embodiment, the communication interface is an interface for wireless communication. For example, communication can thus be implemented using one of the wireless interfaces of a smartphone, for example a WLAN interface, Bluetooth or another near field communication interface (NFC).

In one embodiment, the apparatus for the angle-based localization of a position on a surface of an object also comprises a camera sensor, and the instructions, when executed by the processor, also cause the programmable device to be configured to store at least one digital image recorded by the camera sensor in association with the angle information captured at the measurement time. Depending on the embodiment, the process of storing the digital image in association with the angle information comprises the situation in which the angle information is stored and the situation in which the position on the surface, which is determined from the angle information, is stored. In this case, the digital image generated advantageously shows a segment of the surface of the object which is related to the position to be identified. This may be the environment of the position to be identified or, for example, another section of a component on which the position lies, in particular the source of the anomaly in the inspection if it is itself difficult for the orientation sensor to reach. The image may therefore show the same measurement position which is measured using the orientation sensor or another position for which a connection to the measurement position of the orientation sensor can then be established, for example using the three-dimensional model of the object.

The orientation information is stored in a database, for example. For this purpose, the apparatus either comprises extra memory or uses the memory of the programmable device.

In one embodiment, the at least one digital image is stored with the angle information captured at the measurement time as metadata in a common file. These data are stored, for example, as metadata in the exchangeable image file format (Exif) in the image file which may be, for example, a JPEG or TIFF file. This establishes a direct connection between the image data and the position data without having to ensure the correct management of the data, for example in a database, for this purpose. In another embodiment, provision is made for the link between the digital image and the angle information to be ensured in another manner. For example, provision may be made for a marking to be generated for the angle information and for this marking to be stored in the metadata of the digital image instead of the angle information, while the information itself is stored together with the marking in a database or a list, which, on the one hand, reduces the volume of the metadata in the image file and, on the other hand, makes it possible, for example, to easily search the angle information data using a search function.

It is also possible to generate a plurality of digital images which all show, for example, the position of the orientation sensor and/or the position of the source, for example from different perspectives and/or with different zoom factors. In one embodiment, provision is made to store images which have been recorded using different camera sensors or different operating modes of the same sensor, for example additionally using an infrared sensor.

In one embodiment, the camera sensor and the orientation sensor have a fixed position with respect to one another, and the orientation sensor is configured to capture associated angle information relating to its current orientation when recording the at least one digital image with the camera sensor, and the instructions, when executed by the processor, also cause the programmable device to be configured to store the associated angle information captured when recording the at least one digital image in association with the at least one digital image. If the orientation sensor and the camera have an unchanging position with respect to one another, in particular if they are situated in the same housing, for example a smartphone, this embodiment provides for the angle information, that is to say the orientation sensor data, to also be respectively captured when recording the respective digital image and to likewise be stored in a database or in the photo metadata or the like. In addition to the location of the position to be identified on the surface of the object, the orientation of the camera when recording the respective image and therefore the viewing angle can also be reproduced.

In one embodiment, the instructions, when executed by the processor, also cause, before recording the at least one image for the position to be identified or the position which has already been determined on the surface of the object, associated angle information associated with one or more historical images stored for this determined position to be provided for comparison. By storing historical digital images, that is to say digital images recorded at earlier times, for the determined position, it is possible to observe, for example, a temporal change in a source in order to identify the need for action in good time. By providing the associated angle information for comparison, the inspector making the recording using the camera sensor can use it for comparison in order to generate comparable digital images without parallax. In one embodiment, a user interface is provided for this purpose and indicates to the user or inspector that the current orientation of the orientation sensor or of the associated camera corresponds to that which was also used for the historical digital images for the position. This can be effected, for example, by means of an optical display on a screen or a display. Alternatively or additionally, provision is made in other embodiments for the correspondence to the historical orientation of the camera or the deviation therefrom to be indicated to the user by means of acoustic signals and/or haptically, for example by means of vibration, for example if the apparatus comprises a mobile telephone.

In one embodiment of the apparatus, the assignment rule which is used to determine the position to be identified on the surface of the object on the basis of the measured angle information is based on a three-dimensional model of the object. Any position on the surface can therefore be assigned to associated angle information. In this case, the three-dimensional model itself implements the assignment rule or this rule is derived therefrom. If the object is a turbine or a generator, for example, provision is made in one embodiment for the model describing the turbine to be divided into sections for particular rotationally symmetrical accessible measurement regions, with each of which sections the region of a blade or of a stator pole core is associated. The three-dimensional model can thus be used to generate a lookup table in which the angle information captured by the orientation sensor has to be assigned to particular blades only using a matching algorithm on the basis of the table, with the result that the processing by the programmable device can be carried out in a very efficient manner and with little computation.

In another exemplary embodiment, the assignment rule is implemented by means of a visual representation of the three-dimensional model and of the captured angle information. The inspector or user of the apparatus can therefore himself check the assignment on the basis of the visual representation. Other sections of the object, for example sources of faults at locations which are difficult for the orientation sensor to access, can therefore also be assigned to the identified position and therefore, for example in the case of a turbine, to the blade identified thereby. The use of a 3-D model allows a position having a fault to be identified even if the position is difficult to access.

If a 3-D model of an object consisting of a plurality of segments is involved, it is possible, depending on the shape of the object, to identify the respective segment from the knowledge of the 3-D model from the angle information by fitting the orientation sensor at a possibly arbitrary location. Suitable objects for this purpose are, for example, turbo generators and their involute conductor turns, turbines, for example steam turbines or gas turbines or components thereof, for example the compressor with its blades or the combustion chamber with its heat shield segments.

If a 3-D model of the object is present as an assignment rule, conspicuous segments with a complicated shape can also be assigned to the correct segment numbers, thus ensuring that the correct damaged segments are replaced, if necessary.

Furthermore, according to a second aspect of the invention, a method for the angle-based localization of a position on a surface of an object comprises at least the following steps: arranging an orientation sensor, which is configured to capture angle information relating to its current orientation at least at a measurement time, in a known relationship relative to a position to be identified on a surface of an object at least at the measurement time, capturing the angle information at the measurement time, and determining the position to be identified by means of assignment to the captured angle information on the basis of an assignment rule for the object, which rule is used to assign associated positions on the surface of the object to the angle information. In this manner, the advantages and special features of the apparatus according to the invention for the angle-based localization of a position on a surface of an object are also implemented within the scope of a method for the angle-based localization of a position on a surface of an object.

In one embodiment of the method, the arranging comprises at least indirectly bringing the orientation sensor into physical contact with the surface of the object at least at the measurement time. The orientation sensor is advantageously brought to the position to be identified directly, for example by means of placement, for example if the sensor is the sensor of a smartphone, or indirectly, for example with the aid of a holding device which may be adapted even better to the respective object, for example, in order to appropriately orient the orientation sensor relative to the surface of the object at the position. The at least indirect arrangement can also relate to the situation in which a further surface, for example a protective casing or sheath, can also be present at a known distance from the surface of the object to be examined above the position to be identified or in which the orientation sensor can be situated in a housing or a smartphone.

In another embodiment of the method, the arranging comprises distantially or contactlessly arranging the orientation sensor in such a manner that it assumes a predefined local relationship with respect to the surface of the object. This is advantageous, in particular, if, for example, direct placement is not possible as a result of obstacles, a protective cover or the surface temperature. In this case, the distance can be achieved in a sensor-assisted manner, for example. For example, two, advantageously at least three, additional sensors can be used, for example, for the laser-based distance measurement, in which case the angles are recorded when the desired parallelism with respect to the analyzed surface is achieved.

In one embodiment, the method also comprises recording at least one digital image with respect to the position to be identified using a camera sensor, and storing the at least one digital image in association with the angle information captured at the measurement time. Associating the captured angle information with a digital image in this case comprises linking either the captured angle information, from which the position to be identified on the surface can be determined with the aid of the assignment rule, or directly already the determined position on the surface to the digital image, wherein the digital image advantageously shows either the position of the orientation sensor on the surface of the object and/or the position of the source of the anomaly during the inspection. It is also possible to generate a plurality of digital images which all show, for example, the position of the sensor and/or of the source, for example from different perspectives, or were recorded with different zoom or using different camera sensors or different operating modes of the same camera sensor.

In one exemplary embodiment, if the camera sensor and the orientation sensor have a fixed position with respect to one another, when recording the at least one digital image using the camera sensor, the method comprises using the orientation sensor to capture associated angle information relating to its current orientation, and storing the associated angle information captured when recording the at least one digital image in association with the at least one digital image. The orientation of the orientation sensor and therefore, on account of the fixed position with respect to one another, for example in a common housing, the orientation of the camera sensor when recording the digital image are therefore recorded for each recording of a digital image, with the result that the viewing angle of the camera remains reproducible and can also be compared with other images for the same position.

In particular, in one exemplary embodiment, before recording the at least one digital image for the determined position on the surface of the object, provision is made for the method to comprise providing associated angle information associated with one or more historical images stored for this determined position for comparison. This has the advantage that a better comparison with historical images, that is to say images recorded earlier, can be carried out because the comparison with the historical angle information makes it possible to ensure that the digital images all show the object from the same viewing direction and no parallaxes occur, for example.

In particular, in one exemplary embodiment of the method, the providing comprises displaying the angle information associated with the one or more stored historical images to a user via a user interface in comparison with angle information relating to the current orientation. The display can be effected here visually or else acoustically and/or haptically, with the result that the user or inspector can easily carry out an adjustment for orientation in earlier recordings before recording a current digital image. A visual adjustment of the angle information can comprise, for example, a visual indicator indicating when the orientation has been correctly adjusted (for example red visual marker when not adjusted, green marker when correctly oriented, with the result that no parallax with respect to earlier recordings occurs). An acoustic adjustment can comprise, for example, using different monitor tones depending on whether the camera has been correctly or incorrectly oriented (for example no tone if correct). A haptic adjustment can comprise activating the vibration alarm, for example if a mobile telephone or a smartphone is used, if the camera has been correctly oriented (or if not).

According to a third aspect, the invention also relates to a computer program product which is provided for use with an apparatus for the angle-based localization of a position on a surface of an object according to one of the described embodiments, wherein the apparatus has an orientation sensor for capturing angle information relating to its current orientation and a programmable device with a processor and a memory which contains an assignment rule for the object with a surface, which rule is used to assign associated positions on the surface of the object to angle information. The computer program product comprises instructions which, when executed by the processor, at least cause the programmable device to receive the angle information captured by the orientation sensor at the measurement time and to determine the position to be identified by means of assignment to the captured angle information on the basis of the assignment rule. The computer program product is provided, for example, on a computer-readable storage medium, that is to say on a storage medium which can be read by the processor or the programmable device using a suitable device. A storage medium may be, for example, a CD-ROM, a DVD, a Blu-ray disc, a hard disk, a memory stick or else a data memory in a cloud or the like. In one embodiment, the model data relating to the object are also stored on the computer-readable storage medium (or another storage medium) and are loaded into the apparatus only for the purpose of carrying out the method.

BRIEF DESCRIPTION OF THE DRAWINGS

Further advantages of the present invention are clear from the detailed description and the figures. The invention is explained in more detail below in connection with the following description of exemplary embodiments with reference to the accompanying drawings, in which.

DETAILED DESCRIPTION OF INVENTION

In the figures, identical or similar elements are provided with identical reference signs if expedient.

It goes without saying that other embodiments can be used and structural or logical changes can be made without departing from the scope of protection of the present invention. It goes without saying that the features of the various exemplary embodiments described above and below can be combined with one another, unless specifically stated otherwise. Therefore, the description should not be interpreted in a restrictive sense, and the scope of protection of the present invention is defined by the attached claims.

Figure 1:
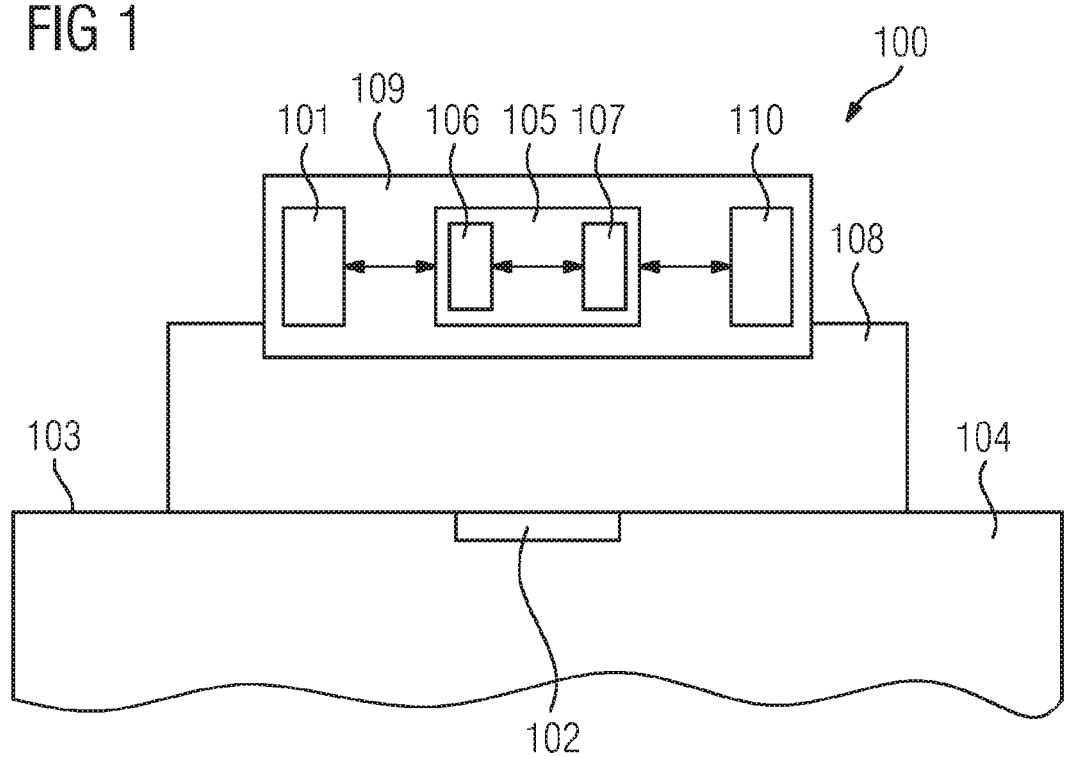
FIG. 1 shows a schematic illustration of a first example of an apparatus for the angle-based localization of a position on a surface of an object according to one embodiment of the invention.

FIG. 1 shows a schematic illustration of a first example of an apparatus for the angle-based localization of a position on a surface of an object according to one embodiment of the invention. The apparatus 100 has an orientation sensor 101 which is configured to be arranged in a known relationship relative to a position 102 to be identified on a surface 103 of an object 104 at least at a measurement time and to capture angle information relating to its current orientation at least at the measurement time. The known relationship relative to the position 102 to be identified on the surface 103 is established using a holding device 108, the underside of which is likewise flat in a manner matching the surface 103. The orientation sensor 101 is therefore in indirect physical contact with the surface 103 of the object 104. In addition to the orientation sensor 101, the apparatus 100 has a programmable device 105 at least with a processor 106 and a memory 107. In the embodiment shown, the orientation sensor 101 and the programmable device 105 are components of a mobile electronic unit and are accommodated in a common housing 109. The memory 107 of the programmable device 105 comprises instructions and at least one assignment rule for the object 104 with the surface 103, which assignment rule is used to assign associated positions on the surface 103 of the object 104 to angle information. These can either be permanently held in the memory 107 or are loaded into the memory 107 when executing a program or an app. The assignment rule can be loaded into the memory 107 (or a memory separate therefrom) separately or during execution of the instructions, for example. When executed by the processor 106 (which may be physically an individual processor or else a plurality of processors or processor cores, depending on the embodiment), the instructions at least cause the programmable device 105 to receive the angle information captured by the orientation sensor 101 at the measurement time and to determine the position 102 to be identified by means of assignment to the captured angle information on the basis of the assignment rule. The apparatus 100 also has a camera sensor 110, and the instructions, when executed by the processor 106, also cause the programmable device 105 to be configured to store at least one digital image recorded by the camera sensor 110 in association with the angle information captured at the measurement time.

Figure 2:
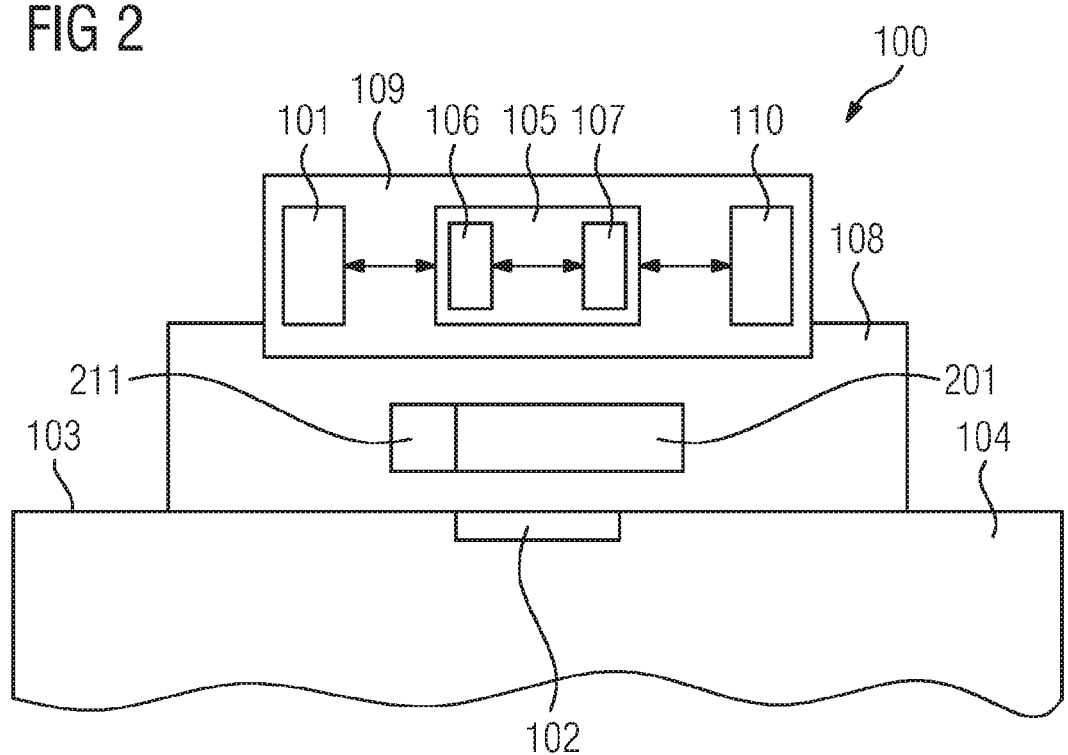
FIG. 2 shows a schematic illustration of a second example of an apparatus for the angle-based localization of a position on a surface of an object according to a further embodiment of the invention.

FIG. 2 shows a schematic illustration of a second example of an apparatus for the angle-based localization of a position on a surface of an object according to one embodiment of the invention. Since FIG. 2 substantially corresponds to FIG. 1, only the components which differ from those in FIG. 1 are explained here for the sake of clarity, and otherwise reference is made to the description of FIG. 1.

In the example shown, the holding device 108 itself additionally has an orientation sensor 201 and a communication interface 211 which can be used to transmit the captured angle information to the programmable device 105, wherein the communication interface 211 is an interface for wireless communication. By virtue of the orientation sensor 201 being accommodated in the holding device 108, it can be larger, more voluminous and can have more accurate hardware components, can be better shielded and can have more effective compensation for influences of external magnetic fields which could influence the orientation sensor. The consideration of external magnetic fields may be relevant, in particular, in the context of installations of a power plant. In the embodiment shown, the housing 109 also furthermore comprises the orientation sensor 101 which is either not used or is likewise used to capture angle information in order to use the redundancy for monitoring or calibration purposes.

Figure 3:
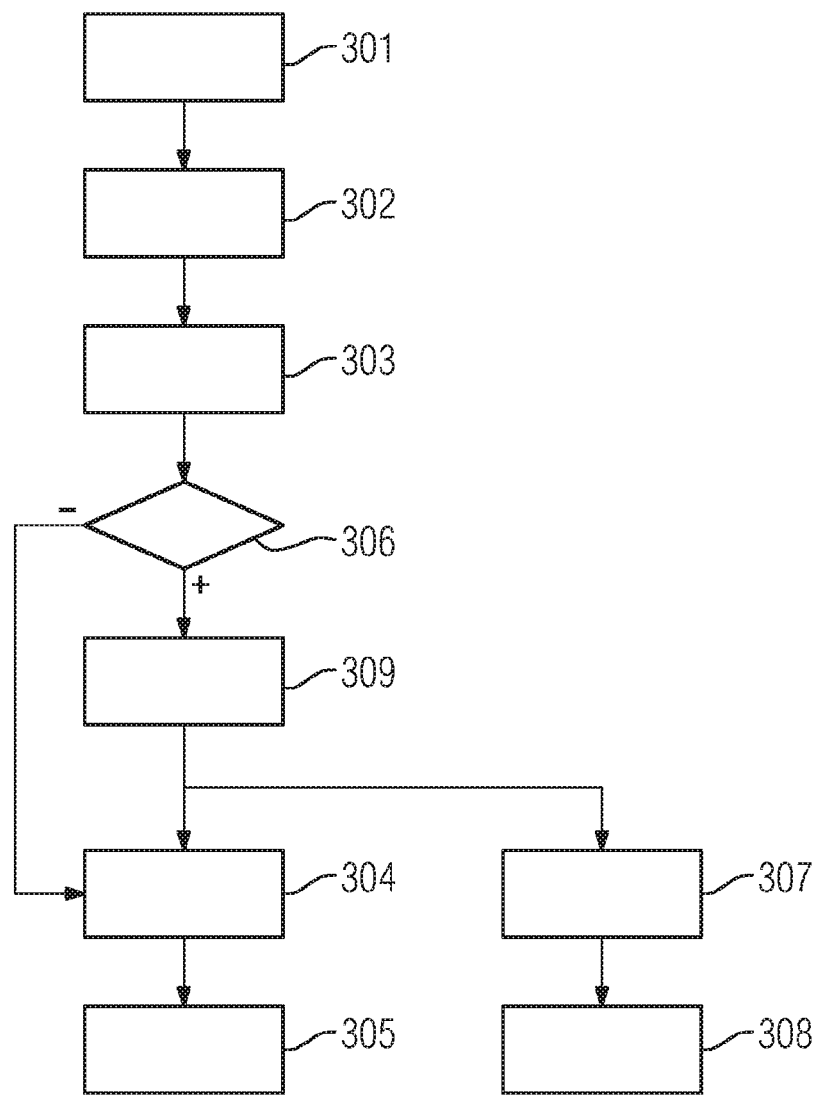
FIG. 3 shows a schematic illustration of an example of a method for the angle-based localization of a position on a surface of an object according to a further embodiment of the invention.

FIG. 3 shows a schematic illustration of an example of a method for the angle-based localization of a position on a surface of an object according to a further embodiment of the invention. The method has at least the following steps: arranging 301 an orientation sensor, which is configured to capture angle information relating to its current orientation at least at a measurement time, in a known relationship relative to a position to be identified on a surface of an object at least at the measurement time, capturing 302 the angle information at the measurement time, and determining 303 the position to be identified by means of assignment to the captured angle information on the basis of an assignment rule for the object, which rule is used to assign associated positions on the surface of the object to the angle information.

In the embodiment shown, the method also has a step of recording 304 at least one digital image with respect to the position to be identified using a camera sensor, wherein, in a next step, the at least one digital image is stored 305 in association with the angle information captured at the measurement time.

In the shown embodiment of the method, provision is additionally made to check 306 whether the camera sensor and the orientation sensor have a fixed position with respect to one another. If this is the case, the orientation sensor is also used to capture 307 associated angle information relating to its current orientation while recording the at least one digital image with the camera sensor, and the associated angle information captured when recording the at least one digital image is stored 308 in association with the at least one digital image.

In this embodiment, if the camera sensor and the orientation sensor have a fixed position with respect to one another, provision is additionally made, before recording the at least one digital image for the determined position on the surface of the object, for associated angle information associated with one or more historical images stored for this determined position to be provided 309 for comparison, wherein the providing 309 comprises, in particular, displaying the angle information associated with the one or more stored historical images to a user via a user interface in comparison with angle information relating to the current orientation.

Figure 4:
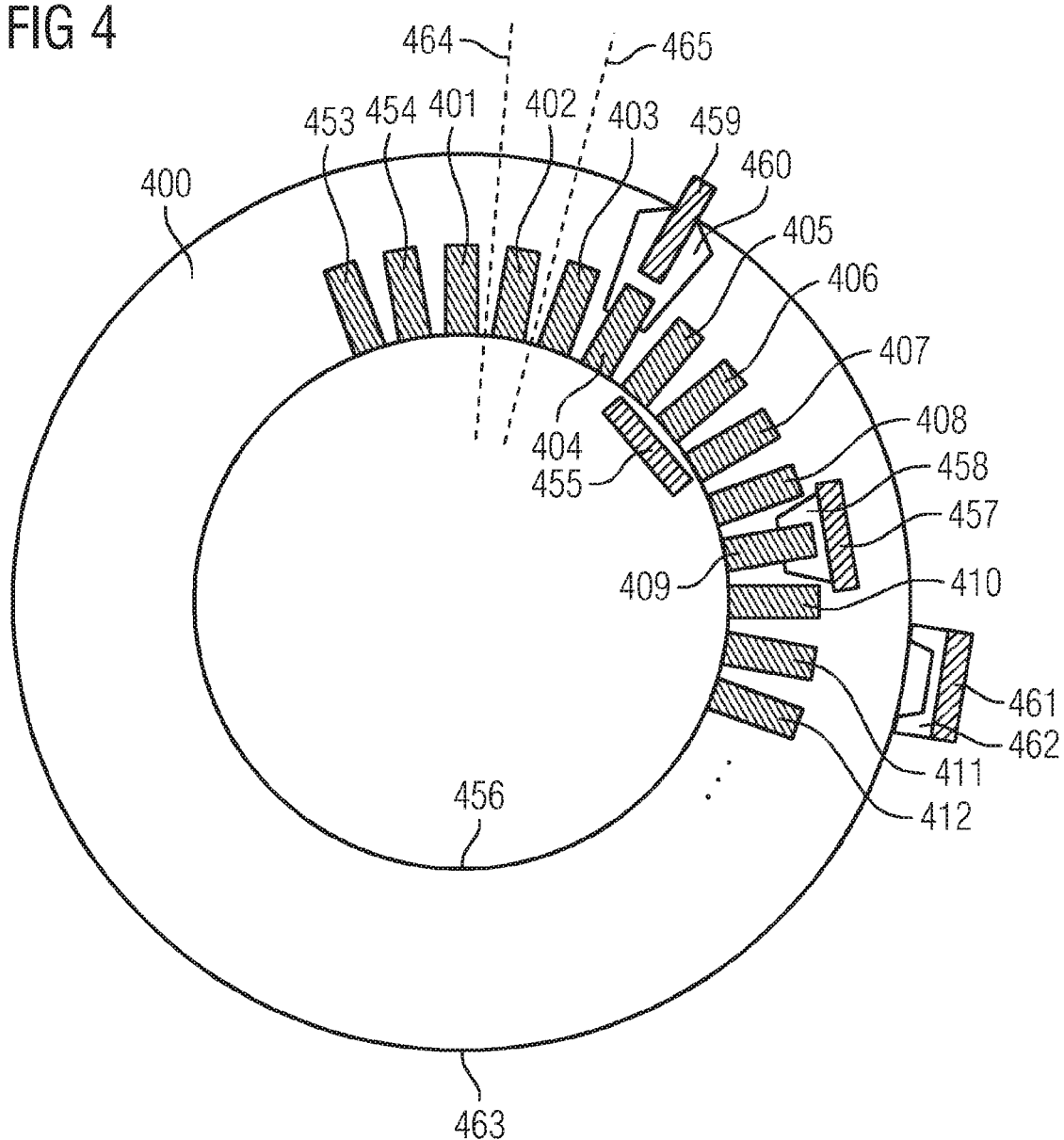
FIG. 4 shows a schematic illustration of an example of stator pole cores which are distributed in a circular manner on a stator of a generator and possible ways of using an apparatus for the angle-based localization of a position to determine the identification number belonging to a stator pole core.

FIG. 4 shows a schematic illustration of an example of winding conductors or grooves in the magnetic core, which are distributed in a circular manner over a stator 400 of a generator, and associated conductors (401, 402, 403, 404, 405, 406, 407, 408, 409, 410, 411, 412, . . . , 453, 454) and possible ways of using an apparatus for the angle-based localization of a position to determine the identification number associated with a groove in the stator magnetic core.

In order to localize the groove 406 in the magnetic core, for example, a first apparatus 455 for the angle-based localization of a position on a surface of an object, which may be implemented using a smartphone, is placed onto the inner surface 456 of the generator stator above the position to be identified.

In order to localize the groove 409 in the magnetic core, for example, a second apparatus 457 for the angle-based localization of a position on a surface of an object, which may likewise be implemented using a smartphone, is fastened to a holder 458 which can be connected with an exact fit to the conductor in the groove 409 in the stator magnetic core, with the result that the apparatus 457 with the orientation sensor is indirectly connected to the groove 409 and has a known angle of 90° relative to the groove 409.

In order to localize the groove 404, for example, a third apparatus 459 for the angle-based localization of a position on a surface of an object, which may likewise be implemented using a smartphone, is fastened to a further holder 460 which can be connected with an exact fit to the conductor in the groove 404, with the result that the third apparatus 459 with its orientation sensor is indirectly connected to the groove 404 and has a known angle of 0° relative to the groove 404.

In order to localize the groove 411, for example, a fourth apparatus 461 for the angle-based localization of a position on a surface of an object, which can likewise be implemented using a smartphone, is fastened to yet another holder 462 or is placed on the latter. This holder is designed to be arranged on an outer surface 463 of the stator 400.

In order to map the discrete angle information measured using the apparatuses to a 3-D model of the stator, the 3-D model of the stator 400 can be subdivided, for example, into a number of segments corresponding to the number of conductors or grooves. Such a segment is indicated in FIG. 4 by the dashed lines 464, 465. For 54 segments, an angular range then respectively corresponds, for example, to a range of −0.5*(360°/54) to +0.5*(360°/54) with respect to the ideal position in the center of the respective segment. A simple lookup table can be generated for the segments, and angle information measured by the orientation sensor of the apparatus can be directly assigned.

Instead of using a first, a second, a third and a fourth apparatus 455, 457, 459, 461, only one apparatus is generally used and is placed at the shown positions in succession, possibly with the aid of a holding device.

An inspection of the object, in this case of the stator, could take place as follows using one of the apparatuses 455, 457, 459, 461 according to the invention:

The inspector first of all finds a position to be identified. He then fastens the apparatus 457, for example a smartphone which executes an app which contains the instructions and has loaded a model of the stator 400 into its memory as an assignment rule, to the holder 458 and then fastens the holder 458 to the conductor to be identified (in the groove 409 in this case). The inspector initiates the capture of the angle information, for example via a button on the user interface of the app executed by the apparatus 457. The app initially allocates an identifier for the measured angle information or directly determines that the groove 409 is involved by accessing the lookup table generated in accordance with the 3-D model of the stator. The inspector then removes the holder 458 from the conductor in the groove 409 and possibly also removes the apparatus 457 from the holder 458. A camera app is then started and the inspector records one or more digital images of the identified position or the position to be identified. The images are then stored together with the identifier or directly with the angle information as metadata, for example as Exif data, which are added to the image data.

Figure 5:
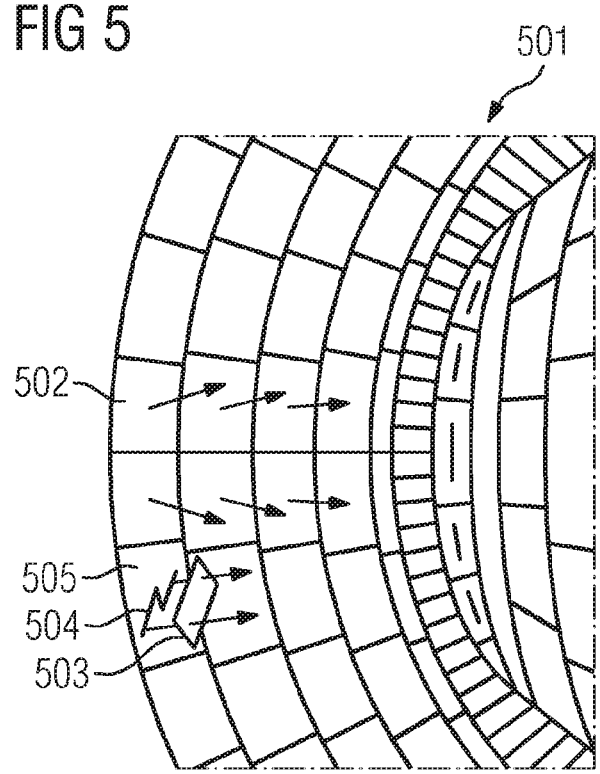
FIG. 5 shows a schematic illustration of an example of a section from a combustion chamber of a gas turbine which is lined with heat shields.

FIG. 5 shows a schematic illustration of an example of a section from a combustion chamber 501 of a gas turbine which is lined with heat shields. The combustion chamber has a multiplicity of heat shields, for example the heat shield 502. The arrows shown indicate an orientation of the respectively associated heat shields. On account of the shape of the combustion chamber, the respective orientation or alignment of the heat shields differs at least slightly from one another, with the result that the determination of the orientation using an orientation sensor allows the heat shields to be uniquely identified. In the example shown, the position to be identified is a crack 504 in the heat shield 505. The affected heat shield 505 and also the course of the crack 504 can be determined by placing an apparatus 503 according to the invention for the angle-based localization of a position on a surface of an object.

Figure 6:
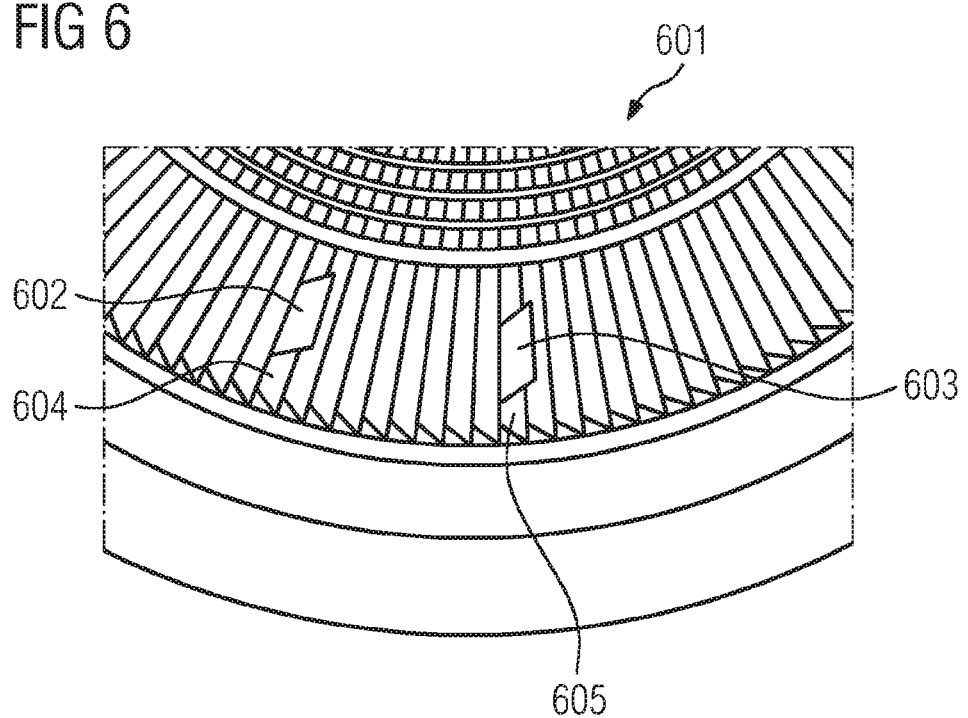
FIG. 6 shows a schematic illustration of an example of a section from a steam turbine with circumferentially arranged guide vanes.

FIG. 6 shows a schematic illustration of an example of a section from a steam turbine 601 with circumferentially arranged guide vanes. In this case, the apparatus 602, 603 for the angle-based localization of a position on a surface of an object, which may be a smartphone, is placed onto the respective guide vanes 604, 605 to be located in order to determine their orientation in order to then assign the associated guide vanes to the measured orientations on the basis of a 3-D model of the steam turbine 601.

The apparatus 602, 603 can likewise be used to infer the current position of the sensor from the outside on the basis of the curvature of the housing of the turbine.

Figure 7:
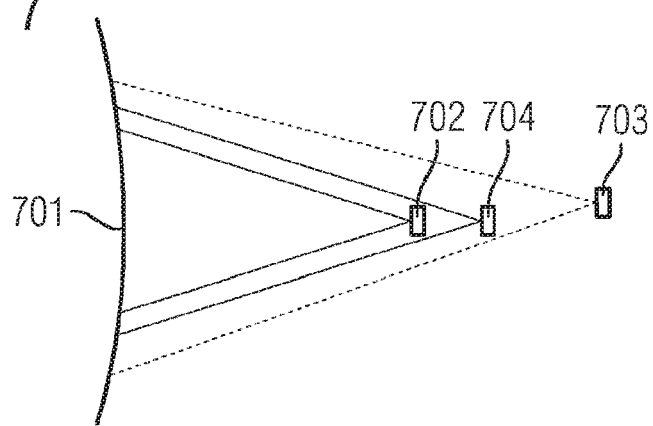
FIGS. 7, 8 and 9 together show a schematic illustration of a principle of the angle-based orientation of a camera for recording a digital image without parallax with respect to a historical recording.
Figure 8:
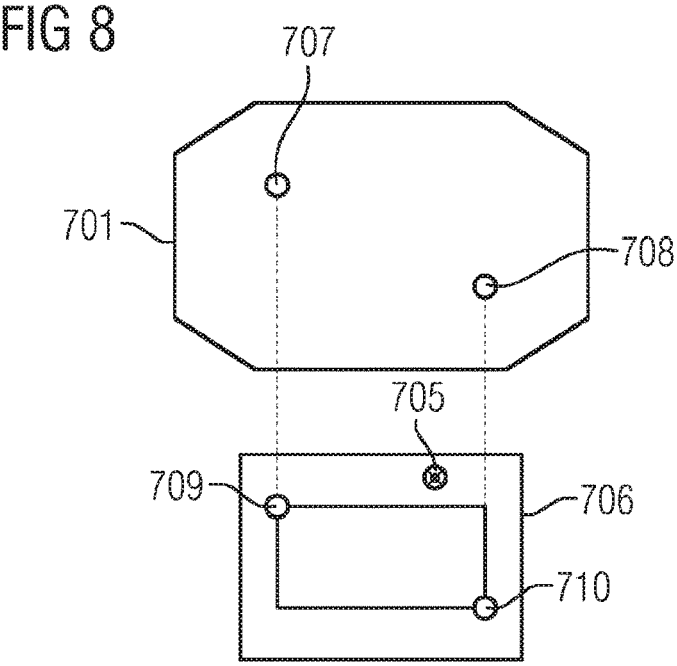
Figure 9:
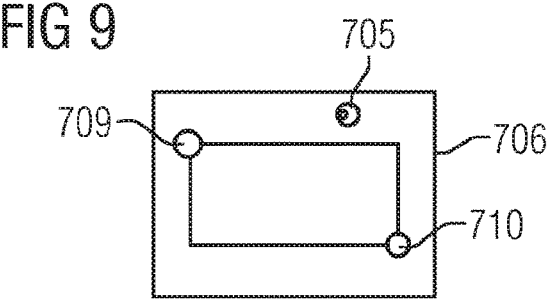

FIGS. 7, 8 and 9 together show a schematic illustration of a principle of the angle-based orientation of a camera for recording a digital image without parallax with respect to a historical recording.

If the apparatus according to the invention comprises a camera sensor, it can be used to record digital images which are intended to remain assigned to the position to be identified. So that an ability to compare the recorded images with images recorded earlier is ensured, the images are intended to be recorded from the same viewing direction if possible without parallax.

In this case, FIG. 7 shows three different camera positions 702, 703, 704 and orientations when recording an image of the surface of an object 701. The historical recording of the object 701 was produced in the first camera position 702. A recording which has a parallax with respect to the historical recording is produced in the second position 703 since the orientation or alignment of the camera in the second position 703 differs from the original orientation in the first camera position 702. In contrast, the orientation of the camera in the third position 704 corresponds to that in the first camera position 702 and an image can be generated without parallax, with the result that a comparison with the image recorded from the first camera position 702 is easily possible even if the field of view or the recorded object section is different for the same zoom factor of the camera since the distance to the object 701 differs.

FIG. 8 shows a possible representation on a screen of the camera or of the apparatus, for example as a superimposition on the current camera image, if the camera is in the third camera position 704. An indicator 705 visually indicates, on a screen 706 of the camera, that the orientation of the cameras corresponds. It is additionally possible to indicate on the screen 706 that the zoom factor has also been selected such that the same image section is shown. Alternatively, the position of the camera can be adapted until the third camera position 704 corresponds to the first camera position 702. In the case shown, this can be discerned by the user from two object elements 707, 708 identified in the image section. If the associated image elements 709, 710 are in the corners of the same rectangle which is defined by the historical recording, the same image section is shown provided that the object elements have remained stationary.

FIG. 9 shows a possible representation on the screen of the camera or of the apparatus if the camera is in the second camera position 703. The indicator 705 indicates that the orientation of the cameras does not correspond, whereas the image section comprises the historical image section, but with a parallax.

If the described camera orientation adjustment is provided, for example during the inspection described with respect to FIG. 4, a possible further sequence of the inspection using camera images may be as follows: the inspector calls up at least one historical recording, for example on the basis of the identifier which was stored with the images. The historical angle information contained in the metadata is used to generate the displays as in FIG. 8 and FIG. 9. The inspector moves the camera until the orientation is indicated as corresponding to the historical orientation, and the inspector generates a current image, from which the associated angle information or an identifier referring to the latter is again stored in the metadata of the newly generated image file.

The figures are not necessarily accurate in every detail and are not necessarily true to scale and can be illustrated in an enlarged or reduced form, for example, in order to provide a better overview. Therefore, functional details disclosed here should not be understood in a restrictive manner, but rather only as a clear basis which provides a person skilled in the art in this field of the art with instructions for using the present invention in various ways.

It goes without saying that method steps, although described according to a certain ordered sequence could partially be carried out in a sequence other than the sequence described here. It also goes without saying that certain steps could be carried out at the same time, that other steps could be added or that certain steps described here could be omitted. In other words: the present descriptions are provided for the purpose of illustrating certain embodiments and should not be interpreted as a restriction of the disclosed subject matter.

The expression "and/or" used here, when used in a series of two or more elements, means that each of the cited elements can be used alone or any combination of two or more of the cited elements can be used. If, for example, a composition is described as containing the components A, B and/or C, the composition can contain A alone; B alone; C alone; A and B in combination; A and C in combination; B and C in combination; or A, B and C in combination.

Although the invention has been described and illustrated in more detail by the exemplary embodiments, the invention is not restricted by the disclosed examples and other variations can be derived therefrom by a person skilled in the art without departing from the scope of protection of the invention.

The invention claimed is:

1. An apparatus for angle-based localization of a position on a surface of an object, comprising:
   an orientation sensor arranged in a known relationship relative to a position to be identified on a surface of an object at a measurement time and to capture angle information relating to its current orientation at the measurement time;
   a programmable device including a processor and a memory, wherein the memory has instructions that, when executed by the processor, cause the programmable device to receive the angle information captured by the orientation sensor at the measurement time and to determine the position to be identified by means of assignment of the captured angle information on the basis of the assignment rule;
   a camera sensor; and
   a user interface, wherein angle information from historical images of the position on the surface of the object are displayed using the user interface for comparison to the current orientation of the orientation sensor.

2. The apparatus as claimed in claim 1, wherein the orientation sensor is in direct physical contact with the surface of the object at the measurement time.

3. The apparatus as claimed in claim 1, wherein the orientation sensor is configured to contactlessly assume a predefined local relationship with respect to the surface of the object.

4. The apparatus as claimed in claim 1, further comprising:
   a holding device which makes it possible to at least arrange the orientation sensor in the known relationship relative to the position to be identified on the surface of the object.

5. The apparatus as claimed in claim 4, wherein the holding device comprises the orientation sensor.

6. The apparatus as claimed in claim 5, wherein the holding device has a communication interface which is used to transmit the captured angle information to the programmable device.

7. The apparatus as claimed in claim 6, wherein the communication interface is an interface for wireless communication.

8. The apparatus as claimed in claim 1, wherein the orientation sensor and the programmable device are accommodated in a common housing.

9. The apparatus as claimed in claim 8, wherein the orientation sensor and the programmable device are components of a mobile electronic unit or a mobile telephone.

10. The apparatus as claimed in claim 1,
    wherein the instructions, when executed by the processor, also cause the programmable device to be configured to store at least one digital image recorded by the camera sensor in association with the angle information captured at the measurement time.

11. The apparatus as claimed in claim 10, wherein the at least one digital image is stored with the angle information captured at the measurement time as metadata in a common file.

12. The apparatus as claimed in claim 10, wherein the camera sensor and the orientation sensor have a fixed position with respect to one another, and the orientation sensor is configured to capture associated angle information relating to its current orientation when recording the at least one digital image with the camera sensor, and the instructions, when executed by the processor, also cause the programmable device to be configured to store the associated angle information captured when recording the at least one digital image in association with the at least one digital image.

13. A non-transitory computer readable media for use with an apparatus for angle-based localization of a position on a surface of an object as claimed in claim 1, wherein the apparatus has an orientation sensor for capturing angle information relating to its current orientation and a programmable device with a processor and a memory operable to assign associated positions on the surface of the object to angle information, and wherein the computer readable media comprises:
   instructions stored thereon which, when executed by the processor, at least cause the programmable device to receive the angle information captured by the orientation sensor at the measurement time and to determine the position to be identified by means of assignment of the captured angle information to the object.

14. A method for angle-based localization of a position on a surface of an object, comprising:
- arranging an orientation sensor, which is configured to capture angle information relating to the current orientation of the orientation sensor at a measurement time, in a known relationship relative to a position to be identified on a surface of an object at the measurement time;
- providing angle information associated with one or more historical images stored for the position to be identified on the surface of the object for comparison,
- capturing the angle information at the measurement time; and
- determining the position to be identified by means of assignment of the captured angle information to the object.

15. The method as claimed in claim 14, wherein the arranging comprises bringing the orientation sensor into physical contact with the surface of the object at the measurement time.

16. The method as claimed in claim 14, wherein the arranging comprises contactlessly arranging the orientation sensor in such a manner that it assumes a predefined local relationship with respect to the surface of the object.

17. The method as claimed in claim 14, further comprising:
- recording at least one digital image with respect to the position to be identified using a camera sensor; and
- storing the at least one digital image in association with the angle information captured at the measurement time.

18. The method as claimed in claim 17, further comprising, if the camera sensor and the orientation sensor have a fixed position with respect to one another, when recording the at least one digital image using the camera sensor, using the orientation sensor to capture associated angle information relating to its current orientation; and
- storing the associated angle information captured when recording the at least one digital image in association with the at least one digital image.

19. The method as claimed in claim 14, wherein the providing comprises displaying the angle information associated with the one or more stored historical images to a user via a user interface in comparison with angle information relating to the current orientation.

* * * * *